(12) United States Patent
Marschke

(10) Patent No.: US 9,897,080 B2
(45) Date of Patent: Feb. 20, 2018

(54) ROTARY CONTROL VALVE FOR REVERSE OSMOSIS FEED WATER PUMP WITH ENERGY RECOVERY

(71) Applicant: General Electric Company, Schenectady, NY (US)

(72) Inventor: Dean David Marschke, Eden Prairie, MN (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 485 days.

(21) Appl. No.: 13/693,743

(22) Filed: Dec. 4, 2012

(65) Prior Publication Data

US 2014/0150872 A1 Jun. 5, 2014

(51) Int. Cl.
  *F04B 7/00* (2006.01)
  *F04B 9/113* (2006.01)
  *C02F 1/44* (2006.01)

(52) U.S. Cl.
  CPC ............ *F04B 7/0046* (2013.01); *C02F 1/441* (2013.01); *F04B 7/0007* (2013.01); *F04B 9/113* (2013.01);
  (Continued)

(58) Field of Classification Search
  CPC .. F04B 5/02; F04B 7/00; F04B 7/0003; F04B 9/08; F04B 9/10; F04B 9/109;
  (Continued)

(56) References Cited

U.S. PATENT DOCUMENTS 2,528,131 A * 10/1950 Garretson ............... F01L 23/00
                                                                              417/344
2,775,982 A    1/1957 Canfield
(Continued)

FOREIGN PATENT DOCUMENTS

CA          2657567 A1    3/2008
CH           586364 A5    3/1977
(Continued)

OTHER PUBLICATIONS

International Search Report and Written Opinion issued in connection with corresponding PCT Application No. PCT/US2013/071381 dated Mar. 17, 2014.
(Continued)

*Primary Examiner* — Bryan Lettman
*Assistant Examiner* — Timothy Solak

(57) ABSTRACT

A liquid pumping system includes at least two water cylinders that are each controlled by a hydraulic piston. A rotary valve controls the hydraulic pistons. The rotary valve has an inner unit that rotates within an outer unit. Slots provided between the inner and outer units control the duration, rate and direction of hydraulic fluid supply to the hydraulic piston. A liquid pumping process comprises distributing an initial flow of pressurized hydraulic fluid between the hydraulic cylinders. The hydraulic cylinders move through a cycle in a phased relationship to provide a constant sum of flow rates from the liquid pumps. In a water treating process, feed water is pumped through the membrane unit. Brine from the membrane unit is returned to each liquid pump while that liquid pump is feeding water to the membrane unit.

15 Claims, 13 Drawing Sheets

(52) U.S. Cl.
CPC .. *Y10T 137/0318* (2015.04); *Y10T 137/85986* (2015.04)

(58) Field of Classification Search
CPC ....... F04B 9/113; F04B 9/1172; F04B 9/1174; F04B 23/04; F04B 49/005; F04B 49/065; F04B 1/00; F04B 9/111; F04B 11/005; F04B 7/0007; F04B 7/0046; F04B 7/0061; F04B 7/0065; F04B 39/08; F04B 39/10; F04B 53/109; F04B 53/1092
USPC ........................ 137/625.15, 625.23
See application file for complete search history.

(56) References Cited

U.S. PATENT DOCUMENTS

| | | | |
|---|---|---|---|
| 2,915,042 A | 12/1959 | Shafer | |
| 3,022,738 A * | 2/1962 | Krute | F01L 33/02 137/625.23 |
| 3,135,293 A * | 6/1964 | Hulsey | F16K 5/0421 137/625.3 |
| 3,374,746 A | 3/1968 | Chenault | |
| 3,685,536 A * | 8/1972 | Bake | F16K 1/12 137/338 |
| 3,762,435 A | 10/1973 | Auwerter | |
| 3,794,292 A | 2/1974 | Jaegtnes | |
| 3,825,122 A | 7/1974 | Taylor | |
| 3,833,200 A | 9/1974 | McCombs, Jr. | |
| 3,941,154 A * | 3/1976 | Bishop | B05B 17/08 137/624.13 |
| 3,977,434 A * | 8/1976 | Albright | A47J 27/0817 137/625.47 |
| 4,009,860 A | 3/1977 | Lingnau | |
| 4,016,083 A | 4/1977 | Sakaguchi et al. | |
| 4,145,884 A | 3/1979 | Childs | |
| 4,285,365 A * | 8/1981 | Coats et al. | 137/625.15 |
| 4,434,056 A | 2/1984 | Keefer | |
| 4,450,863 A | 5/1984 | Brown | |
| 4,459,952 A * | 7/1984 | Holstein | F02M 63/0215 123/198 F |
| 4,505,184 A * | 3/1985 | McDonald | G05B 19/44 137/624.13 |
| 4,526,340 A | 7/1985 | Kolchinsky et al. | |
| 4,574,840 A * | 3/1986 | Schumann et al. | 137/625.15 |
| 4,644,969 A | 2/1987 | Watanabe | |
| 4,697,619 A | 10/1987 | Tiefenthaler | |
| 4,705,627 A | 11/1987 | Miwa et al. | |
| 4,724,866 A | 2/1988 | Bates et al. | |
| 4,838,145 A * | 6/1989 | Slocum | F15B 13/07 137/625.23 |
| 4,913,809 A | 4/1990 | Sawada et al. | |
| 5,154,820 A | 10/1992 | Solomon | |
| 5,222,873 A | 6/1993 | Whitehead et al. | |
| 5,339,857 A | 8/1994 | Scallan et al. | |
| 5,350,047 A * | 9/1994 | Kimura | B60K 37/06 137/625.23 |
| 5,466,132 A * | 11/1995 | Deal | F04B 7/0007 137/876 |
| 5,476,222 A * | 12/1995 | Singer | B05B 7/0861 239/99 |
| 5,542,384 A | 8/1996 | Rosenmann et al. | |
| 5,628,198 A | 5/1997 | Permar | |
| 5,634,779 A | 6/1997 | Eysymontt | |
| 5,645,263 A | 7/1997 | Aardema | |
| 5,967,108 A | 10/1999 | Kutlucinar | |
| 6,017,200 A * | 1/2000 | Childs | B01D 61/06 417/390 |
| 6,135,724 A | 10/2000 | Yoder et al. | |
| 6,205,780 B1 | 3/2001 | Zervas | |
| 6,244,838 B1 | 6/2001 | Couillard et al. | |
| 6,263,905 B1 | 7/2001 | Yokota et al. | |
| 6,266,598 B1 | 7/2001 | Pillar et al. | |
| 6,267,571 B1 | 7/2001 | Anderson et al. | |
| 6,468,831 B2 | 10/2002 | Leong et al. | |
| 6,470,683 B1 | 10/2002 | Childs et al. | |
| 6,491,813 B2 | 12/2002 | Verde | |
| 6,623,254 B2 | 9/2003 | Chowaniec et al. | |
| 6,652,741 B1 | 11/2003 | Marinzet | |
| 6,708,489 B2 | 3/2004 | Massey et al. | |
| 6,773,226 B2 | 8/2004 | Al-Hawaj | |
| 6,841,076 B1 | 1/2005 | Wobben | |
| 7,000,379 B2 | 2/2006 | Makki et al. | |
| 7,032,388 B2 | 4/2006 | Healy | |
| 7,152,620 B2 | 12/2006 | Baumgarten et al. | |
| 7,168,927 B2 | 1/2007 | Brueckmann et al. | |
| 7,415,937 B2 | 8/2008 | Giesler et al. | |
| 7,540,230 B2 | 6/2009 | Rojanskiy et al. | |
| 7,634,911 B2 | 12/2009 | Brinkman | |
| 7,753,072 B2 | 7/2010 | Douglas et al. | |
| 7,757,714 B2 | 7/2010 | Meinhof | |
| 7,905,088 B2 | 3/2011 | Stephenson et al. | |
| 7,927,082 B2 | 4/2011 | Haudenschild | |
| 8,186,154 B2 | 5/2012 | Nelson et al. | |
| 9,119,676 B2 | 9/2015 | Daly et al. | |
| 2001/0017278 A1 | 8/2001 | Verde | |
| 2002/0000648 A1 | 1/2002 | Leong et al. | |
| 2002/0134441 A1 | 9/2002 | Kusumoto et al. | |
| 2003/0024239 A1 | 2/2003 | Massey et al. | |
| 2003/0116122 A1 | 6/2003 | Haeberer et al. | |
| 2003/0118459 A1 * | 6/2003 | Gerhardt et al. | 417/390 |
| 2005/0062000 A1 | 3/2005 | Bartell, Jr. et al. | |
| 2005/0123416 A1 | 6/2005 | Smith | |
| 2006/0071189 A1 | 4/2006 | Cornwell et al. | |
| 2007/0045069 A1 | 3/2007 | Schedgick et al. | |
| 2007/0128056 A1 * | 6/2007 | Haudenschild | 417/415 |
| 2007/0246678 A1 | 10/2007 | Michaels | |
| 2010/0063494 A1 | 3/2010 | Orszulak | |
| 2010/0154401 A1 | 6/2010 | Sullivan, Jr. et al. | |
| 2010/0301252 A1 | 12/2010 | Myran et al. | |
| 2011/0017310 A1 | 1/2011 | Eriksson | |
| 2011/0077783 A1 | 3/2011 | Karpman et al. | |
| 2011/0198290 A1 | 8/2011 | Oklejas | |
| 2012/0067432 A1 | 3/2012 | Vigholm et al. | |
| 2012/0118810 A1 | 5/2012 | Giles et al. | |
| 2014/0154099 A1 | 6/2014 | Sivaramakrishnan et al. | |

FOREIGN PATENT DOCUMENTS

| | | |
|---|---|---|
| CN | 2716251 Y | 8/2005 |
| CN | 1721047 A | 1/2006 |
| CN | 2926197 | 7/2007 |
| DE | 2444740 A1 | 4/1976 |
| DE | 102007033498 A1 | 1/2009 |
| DE | 102008011982 A1 | 9/2009 |
| EP | 0292267 A2 | 11/1988 |
| GB | 2356432 A | 5/2001 |
| JP | 2005195081 A | 7/2005 |
| JP | 2010063976 A | 3/2010 |
| WO | 199119676 A1 | 12/1991 |
| WO | 03051598 A1 | 6/2003 |
| WO | 2007/146321 A1 | 12/2007 |
| WO | 2009151174 A1 | 12/2009 |
| WO | 2010030723 A1 | 3/2010 |
| WO | 2012085326 A1 | 6/2012 |

OTHER PUBLICATIONS

Childs, Willard D. and Ali Dabiri, VARI-RO™ Desalting Pilot Plant Testing and Evaluation, Final Technical Report, Science Applications International Corporation; San Diego CA; Water Treatment Technology Program; US Department of the Interior, Bureau of Reclamation, Untied States of America; May 1998.

Denison Hydraulics, GoldCup Digital Hi-IQ Control, Electronic Control Card User Manual Software Version 2.2b, Jun. 4, 2002.

Search Report and Written Opinion from PCT Application No. PCT/US2012/055695 dated Dec. 12, 2012.

Sanz, Miguel Angel, Energy as Motor of Seawater Reverse Osmosis Desalination Development, WISA Membrane Technology Conference 2011, Sep. 11-14, 2011, Umhlanga, South Africa.

(56) References Cited

OTHER PUBLICATIONS

Bross, Stephan et al., SWRO core hydraulic system: Extension of the SalTec DT to higher flows and lower energy consumption Desalination 203 (2007) 160-167.

Search Report and Written Opinion from PCT Application No. PCT/US2012/057813 dated Jan. 4, 2013.

Childs, Willard D., et al., Energy and Capital Cost Savings with a Highly Efficient Integrated Pumping and Energy Recovery System, IDA World Congress—Atlantis, The Palm—Dubai, UAE, Nov. 7-12, 2009.

Fluid Power Lecture Notes, accessed at http://paws.wcu.edu/ballaaron/www/met441/notes/notes.html on Jul. 3, 2013, Figures 4 and 5, p. 9.

International Search Report and Written Opinion dated Mar. 17, 2014 issued against related PCT application No. PCT/US2013/071834.

Office Action dated Mar. 30, 2015, issued against related Chinese application No. 201280047732.5.

Office Action dated Jan. 22, 2015, issued against related U.S. Appl. No. 13/250,463.

International Search Report and Written Opinion dated Mar. 17, 2014, issued against related PCT Application No. PCT/US2013/071381.

Office Action dated Nov. 4, 2015, issued against related U.S. Appl. No. 13/250,674.

Childs et al., "VARI-RO Direct Drive Engine Study", Science Applications International Corporation, pp. 1-54, 1998.

Stover, "Energy Recovery Devices for Seawater Reverse Osmosis", Everything About Water, pp. 40-46, 2006.

Sun et al., "Energy Recovery Device with a Fluid Switcher for Seawater Reverse Osmosis System", Chinese Journal of Chemical Engineering, vol. 16, Issue 2, pp. 329-332, 2008.

Contreras, "An Energy Recovery Device for Small-Scale Seawater Reverse Osmosis Desalination", A Doctoral Thesis, Submitted in partial Fulfilment of the Requirements, for the Award of Doctor of Philosophy of Loughborough University, pp. 1-146, Dec. 9, 2009.

"GE Introduces Major Energy Efficiency Breakthrough for Desalination Plants", General Electrical, 2012.

PCT Search Report and Written Opinion issued in connection with related PCT Application No. PCT/US2013/071829 dated Mar. 17, 2014.

Unofficial English Translation of Chinese Office Action issued in connection with related CN Application No. 2012800477132 dated Feb. 9, 2015.

Non-Final Office Action issued in connection with related U.S. Appl. No. 13/693,762 dated Dec. 3, 2015.

Non-Final Office Action issued in connection with related U.S. Appl. No. 13/250,674 dated Mar. 2, 2016.

Office Action dated Mar. 2, 2016, issued on corresponding U.S. Appl. No. 13/250,674.

Office Action dated Dec. 3, 2015, issued on corresponding U.S. Appl. No. 13/693,762.

US Non-Final Office Action issued in connection with Related U.S. Appl. No. 13/250,674 dated Jul. 20, 2016.

\* cited by examiner

ROTARY CONTROL VALVE FOR REVERSE OSMOSIS FEED WATER PUMP WITH ENERGY RECOVERY

FIELD

This invention relates to devices and processes for pumping liquids with energy recovery; to membrane filtration, for example by reverse osmosis; and to desalination.

BACKGROUND

Many areas of the world do not have adequate fresh water supplies but they are near seawater. Seawater can be desalinated using reverse osmosis (RO). During RO, the feed water must be pressurized above the osmotic pressure of the feed water. The feed water becomes concentrated during this process and its osmotic pressure increases. Feed water pressures for seawater reverse osmosis (SWRO) are typically in a range of 50-70 bar (approximately 725 psi to 1015 psi).

Pressurizing the seawater in an RO system consumes energy. One approach to reduce energy consumption is to recover energy from the residual pressure of the brine after it leaves an RO module. An energy recovery pumping system is described by Childs et al. in U.S. Pat. No. 6,017,200 entitled "Integrated Pumping and/or Energy Recovery System." This approach uses multiple water cylinders moving in a phased relationship to provide pressurized feed water to a RO membrane unit. One side of a piston in the water cylinder drives the feed water to the RO membrane unit while the other side of the piston receives brine from the RO membrane unit. The pressure of the brine reduces the power required to move the piston. Each water cylinder is connected to a separate hydraulic pump and hydraulic cylinder combination to move the piston in the water cylinder according to a desired velocity profile and to provide the additional energy required to pressurize the feed water.

U.S. patent application Ser. No. 13/250,463, entitled "Energy Recovery Desalination", by D'Artenay et al. describes an energy recovery pumping system that makes various improvements to the Childs et al. system. For example, each of the hydraulic pumps has an adjustable swash plate to change the rate and direction of hydraulic fluid flow to its associated hydraulic cylinder. Inner and outer control loops are used to modify the position of the swash plate so that the water cylinder connected to the hydraulic cylinder follows an intended velocity profile more closely.

SUMMARY OF THE INVENTION

A liquid pumping system is described in this specification that comprises a plurality of water pumps and a hydraulic drive unit. Each liquid pump is driven by a separate hydraulic cylinder. The hydraulic cylinders are powered by a shared hydraulic pump through one or more rotary valves. The one or more rotary valves are configured to distribute a flow of hydraulic fluid from the hydraulic pump between the hydraulic cylinders such that the liquid pumps operate in a phased relationship to each other. Preferably, the total liquid flow produced from the liquid pumps is generally constant over a period of time in which the hydraulic pump produces a generally constant output.

A membrane filtration system is described in this specification that uses the liquid pumping system to provide feed water to a membrane unit. A water circuit is configured such that each liquid pump receives pressurized brine from the membrane unit while pumping water. The membrane unit may be a reverse osmosis unit.

Processes are described in this specification for pumping a liquid and for treating water. The liquid pumping process comprises a step of providing an initial flow of pressurized hydraulic fluid. The initial flow of pressurized hydraulic fluid is distributed between a plurality of hydraulic cylinders such that, over a period of time in which the initial flow is essentially constant, the sum of the distributed flows is also essentially constant but the hydraulic cylinders move in a phased relationship to each other. Each hydraulic cylinder drives a liquid pump. In the water treating process, water is pumped to a membrane unit. Brine from the membrane unit is provided to each liquid pump while that liquid pump is feeding water to the membrane unit. Preferably, the liquid pumps produce a generally constant flow of feed water to the membrane unit. Optionally, the membrane unit may be a reverse osmosis unit.

The processes and systems provide useful alternative ways and means for pumping liquids or treating water. Without limitation, the processes and systems may be used in the desalination industry. Optionally, the water pumps and hydraulic drive unit or the process may be used to pump other fluids for other applications.

DETAILED DESCRIPTION

Figure 1:
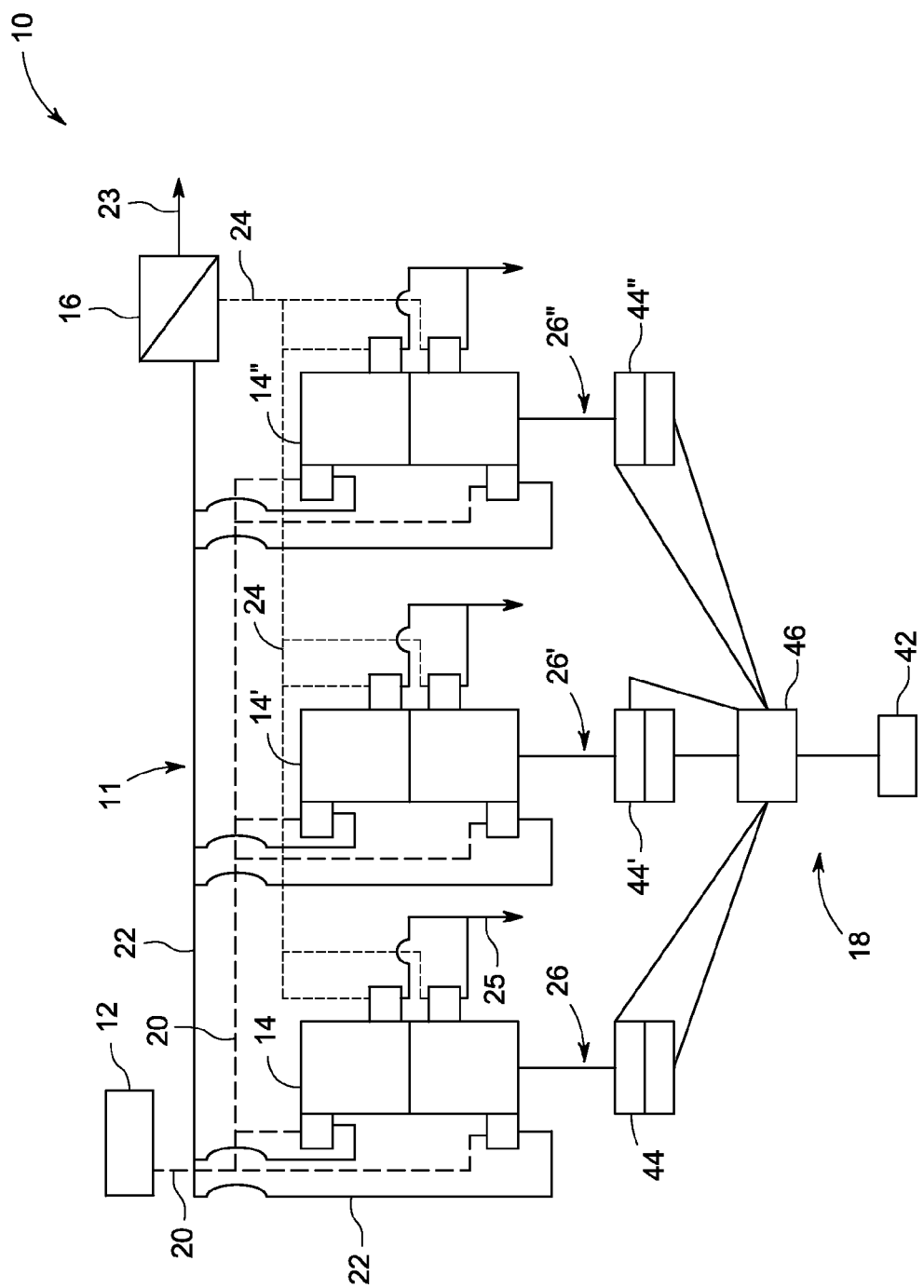
FIG. 1 is a schematic diagram of a water treatment system having a fluid pumping system and a membrane unit.

FIG. 1 shows a system 10 for treating water. The system 10 comprises a feed water source 12, a pumping system 11 and a membrane unit 16, for example a reverse osmosis unit. The pumping system 11 provides feed water from the source 12 to the membrane unit 16, preferably at a high pressure and generally constant flow rate. The flow rate may be varied by an operator from time to time. However, the flow rate is constant in the sense that it is generally the same as a fixed reference value, for example within about 10% of the reference value, for a period of time. During the period of time, which may be an hour or more, the components of the pumping system 11 may move through many, for example 10 or more or 100 or more, cycles.

The pumping system 11 has two or more water cylinders 14 and a hydraulic drive unit 18. The water cylinders 14, and the valves and conduits of a water circuit connecting them to the membrane unit 16, may be similar to those described in U.S. Pat. No. 6,017,200, entitled "Integrated Pumping and/or Energy Recovery System", U.S. patent application Ser. No. 13/250,463 entitled "Energy Recovery Desalination" and U.S. patent application Ser. No. 13/250,674 entitled "Valve System for Pressure Recovery in IPER", which are incorporated herein by reference. The pumping system 11 shown has three water cylinders 14 but alternatively there may be two, four or other numbers of water cylinders 14. Alternatively, other types of water pumps may be used in place the water cylinders 14. The pumping system 11 may also be used to pump other liquids.

Feed water, for example seawater, brackish water, groundwater, boiler feed water or wastewater, flows from the feed water source 12 to the water cylinders 14 via low pressure feed pipes 20. The feed water is pressurized within the water cylinders 14 and directed to the membrane unit 16 via high pressure feed pipes 22. Each water cylinder 14 goes through approximately the same cycle but the cycles have a phased relationship to each other such that at any given point in time each water cylinder 14 is in a different part of its cycle.

The membrane unit 16 separates the feed water into a low pressure stream of low-solute permeate and a high pressure stream of high-solute brine, alternatively called concentrate or retentate. The permeate is withdrawn from the membrane unit 16 for various uses, for example drinking water, through permeate pipe 23. The brine is directed back to the water cylinders 14, via high pressure brine pipes 24. Each water cylinder 14 receives brine while providing feed water such that the pressure of the brine can be used to help pressurize the feed water. Low-pressure brine, after being used to help generate feed water pressure, is directed from the water cylinder 14 for waste, recycling or reuse via low pressure brine pipes 25. The water cylinders 14 are dual acting pumps that pump feed water on both a forward and a reverse stroke.

Variations of the system 10 may have two, three or more water cylinders 14. The description immediately below will focus on one water cylinder 14 and the movement of a single reciprocating assembly 26 that is part of the water cylinder 14. However, other parts of the description and figures may use the superscript text """ and """" to denote a particular water cylinder 14, 14', 14", features of the system 10 associated with a particular water cylinder 14, 14', 14" or a set of water cylinders 14, 14', 14".

Figure 1A:
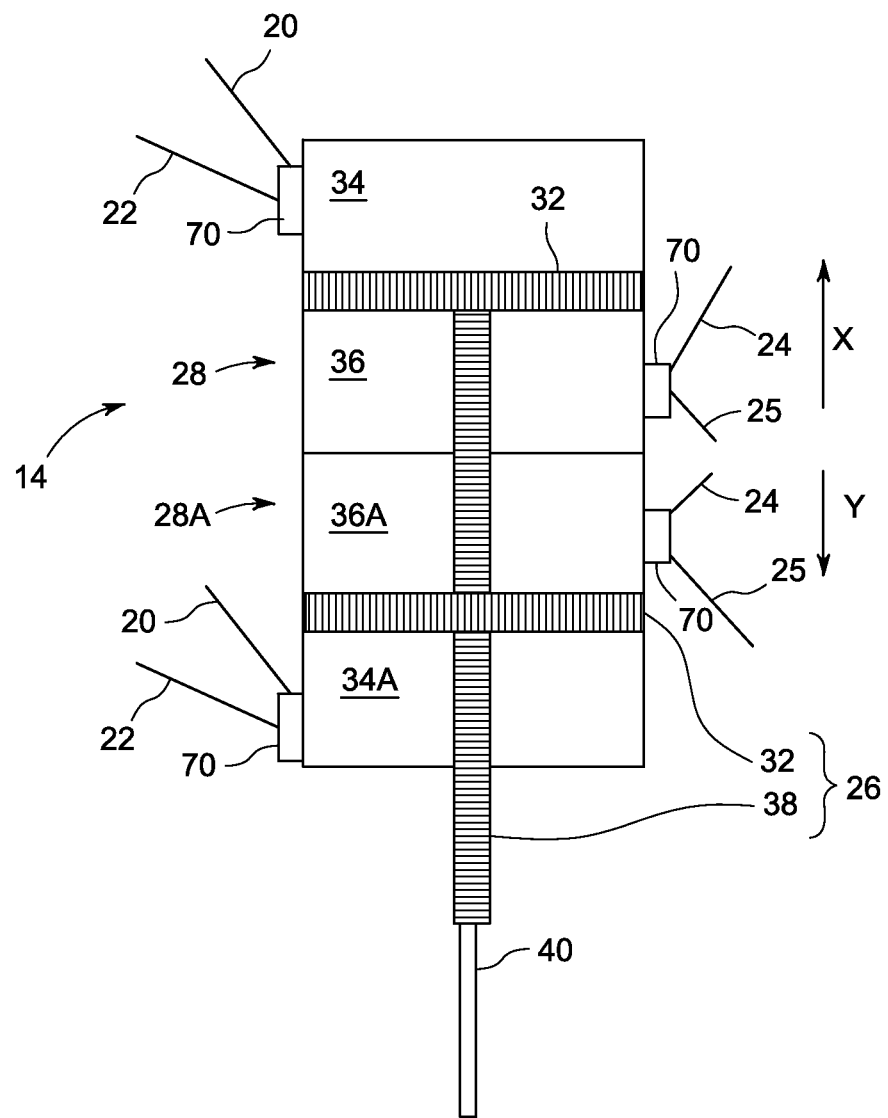
FIG. 1A is a cross-sectional schematic of an example water cylinder for use in the system of FIG. 1.

Referring to FIG. 1A, each water cylinder 14 has a first and a second water piston chamber 28, 28A. In the example of FIG. 1A, the water piston chambers 28, 28A are located in a single housing, but alternatively they may be located in separate housings. Each water piston chamber 28, 28A has a water piston 32. The water pistons 32 separate the water piston chambers 28, 28A into feed water working chambers 34 and concentrate working chambers 36. Each water cylinder 14, therefore, has first and second feed water working chambers 34, 34A and a first and a second concentrate working chambers 36, 36A. Preferably, the feed water working chambers 34, 34A are at the ends of the water cylinder 14 and the concentrate working chambers 36, 36A are at the middle of the water cylinder 14. Optionally, other configurations of water cylinder 14 may be used.

The water pistons 32 are mechanically coupled to each other by a connecting rod 38. The connecting rod 38 extends through a dividing wall between the concentrate working chambers 36, 36A and out of the water cylinder 14 through bearing and seal assemblies (not shown), which minimize or prevent pressure or fluid leaks. The connecting rod 38 and the dual-acting pistons 32 are collectively referred to as the reciprocating assembly 26.

Figure 1B:
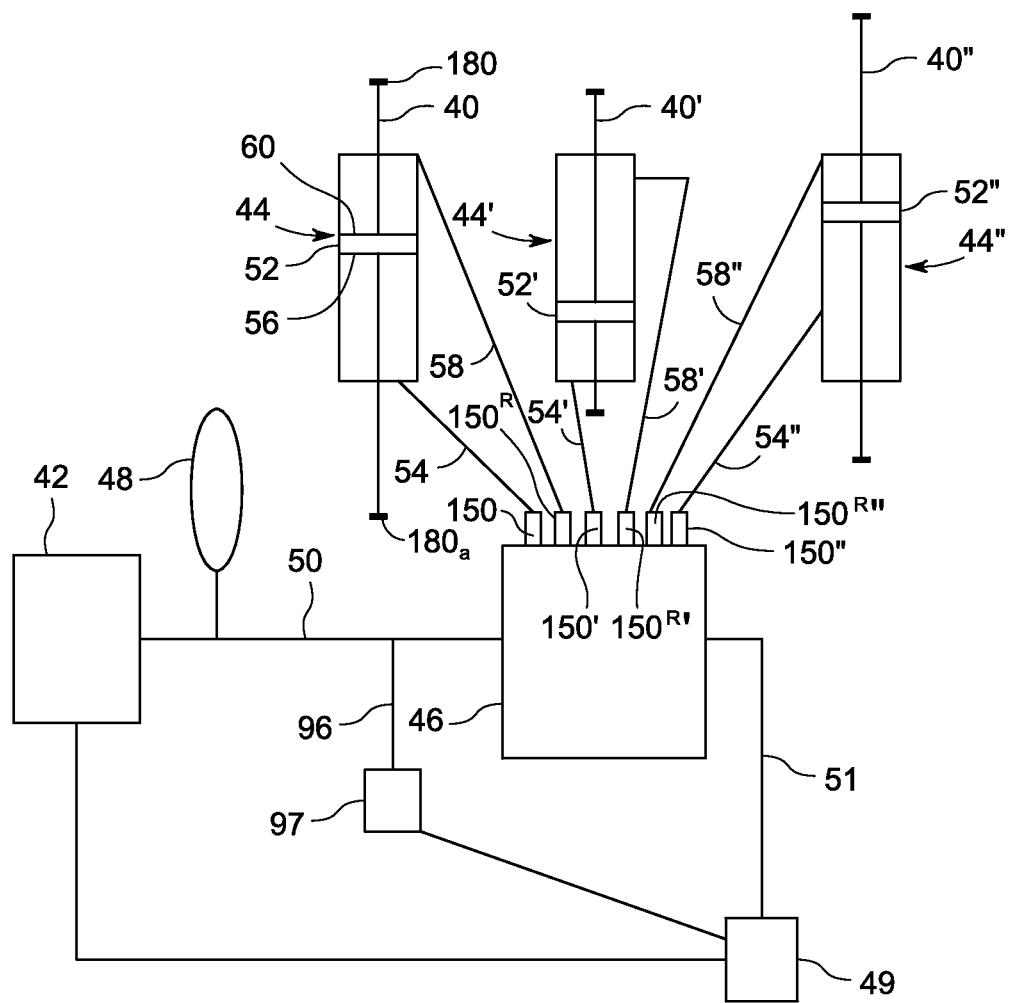
FIG. 1B is a schematic diagram of a hydraulic drive unit.

The reciprocating assembly 26 is connected to a piston rod 40 of a hydraulic piston 52 (see FIG. 1B). In the example of FIG. 1, the piston rod 40 and the reciprocating assembly 26 move in unison and have the same acceleration, the same velocity and the same direction of travel during the same period of time. Alternatively, other connections may be provided between the piston rod 40 and the reciprocating assembly 26 such that there is a transformation between the movement of the piston rod 40 and the reciprocating assembly 26. For example, the piston rod 40 and the reciprocating assembly 26 may be connected by a gear set, lever or hydraulic transducer such that the reciprocating assembly 26 moves through a shorter or longer stroke or in a reverse direction relative to the piston rod 40.

Each water cylinder 14 comprises water cylinder valves 70 that control the flow of liquid into and out of the water cylinders 14. Opening and closing of the water cylinder valves 70 is controlled by a controller 90 in association with the movement of the reciprocating assembly 26. Optionally, the water cylinder valves 70 may be similar to those described in U.S. Pat. No. 6,017,200, entitled "Integrated Pumping and/or Energy Recovery System", U.S. patent application Ser. No. 13/250,463 entitled "Energy Recovery Desalination" and U.S. patent application Ser. No. 13/250,674 entitled "Valve System for Pressure Recovery in IPER".

While the reciprocating assembly 26 moves forwards, or upwards as it is oriented in FIG. 1A, the water cylinder valves 70 are configured such that: feed water in the upper working chamber 34 flows out to a high pressure feed pipe 22; brine flows into the upper concentrate working chamber 36 from a high pressure brine pipe 24; water flows out of the lower concentrate working chamber 36A to a low pressure brine pipe 25; and, feed water flows into the lower feed water working chamber 34A from a low pressure feed pipe 20. While the reciprocating assembly 26 moves in reverse, or downwards as it is oriented in FIG. 1A, the water cylinder valves 70 are configured such that: feed water flows into the upper working chamber 34 from a low pressure feed pipe 20; brine flows out of the upper concentrate working chamber 36 to a low pressure brine pipe 25; water flows into the lower concentrate working chamber 36A from a high pressure brine pipe 24; and, feed water flows out of the lower feed water working chamber 34A to a high pressure feed pipe 22. The water cylinder valves 70 are re-configured near or during dwell periods between forward and reverse movements of the reciprocating assembly 26. In this way, energy is recovered from the pressurized brine to help provide pressurized feed water to the membrane unit 16.

FIG. 1B shows the hydraulic drive unit 18. The hydraulic drive unit 18 has a hydraulic pump 42, two or more hydraulic cylinders 44 and a control valve 46. Each hydraulic cylinder 44 has a hydraulic piston 52 connected to a piston rod 40. Referring to FIG. 1A, each piston rod 40 is connected to the reciprocating assembly 26 of a water cylinder 14.

Over a period of time, for example an hour or more, when a generally constant flow of feed water to the membrane unit 16 is desired, the hydraulic pump 42 is operated at a generally constant output. The hydraulic pump 42 provides a generally constant flow of hydraulic fluid at a generally constant pressure through supply pipe 50 to the control valve 46. The hydraulic pump 42 may be one of a number of variable displacement pumps, including but not limited to: axial piston pumps, bent axis pumps and pressure compensated variable displacement pumps. Alternatively, the hydraulic pump 42 may be one of a number of fixed displacement pumps, including but not limited to: rotary vane pumps, piston pumps and diaphragm pumps, with a motor that may be controlled by a variable frequency drive unit. Return pipe 51 conducts hydraulic fluid returning from the control valve 46 to a hydraulic fluid reservoir 49. Optionally, a filter may be provided in the return pipe 51. The pressure of the supplied hydraulic fluid may be in a range of about 5 p.s.i. to about 4000 p.s.i.

Optionally, the hydraulic pump 42 may supply hydraulic fluid to the valve set 45 through an accumulator 48 to accommodate temporary pressure increases or decreases in the supply pipes 50. Optionally, the hydraulic drive unit 18 may further comprise a pressure relief loop 96 with a pressure relief valve 97. The pressure relief loop 96 connects the supply line 50 to the hydraulic fluid reservoir 49. The pressure relief valve 97 opens if pressure in the supply line 50 exceeds a pre-set pressure indicating a failure in the hydraulic drive unit 18.

For each hydraulic cylinder 44, a forward feed pipe 54 connects the control valve 46 to a chamber of the hydraulic cylinder 44 in communication with the first side 56 of the hydraulic piston 52. A reverse feed pipe 58 connects the control valve 45 to another chamber of the hydraulic cylinder 44 in communication with and a second side 60 of the hydraulic piston 52.

The control valve 46 receives a generally constant flow of hydraulic fluid from the hydraulic pump 42 and distributes the hydraulic fluid between the hydraulic cylinders 44. For example, in relation to each hydraulic cylinder 44, the valve set 45 may direct pressurized hydraulic fluid to the first side 56 of the hydraulic piston 52 or to the second side 60 of the hydraulic piston 52, or the valves set 45 may stop the flow of hydraulic fluid to the hydraulic cylinder 44. The valve set 45 may also return hydraulic fluid from the hydraulic cylinder 44 to the hydraulic fluid reservoir 49. The valve set 45 may be configured such that low pressure returning hydraulic fluid flows through the same, or a different, valve body that the pressurized hydraulic fluid flows through.

Table 1 below provides a summary of available positions of a portion of the control valve 46 connected to one hydraulic piston 52. The control valve 46 is able to transition between these positions in repeated cycles, the cycle comprising the following sequence of positions: position 1; position 2; position 3; position 2. A portion of the control valve 46 associated with each hydraulic piston 52 rotates through the same cycles but the individual portions of the control valve 46 are operated in a phased relationship to each other. Each portion is phased by the next portion by 360 degrees divided by N, wherein N is the number of hydraulic cylinders 52. The sum of the flow rates of pressurized hydraulic fluid to forward feed pipes 54 and reverse feed pipes 58 is essentially constant over a period of time in which the flow rate in the supply pipe 50 is essentially constant.

TABLE 1

|  | Position 1 | Position 2 | Position 3 |
| --- | --- | --- | --- |
| Supply pipe 50 | OPEN to forward feed pipe 54 | CLOSED | OPEN to reverse feed pipe 58 |
| Return pipe 51 | OPEN to reverse feed pipe 58 | CLOSED | OPEN to forward feed pipe 54 |

Figure 1C:
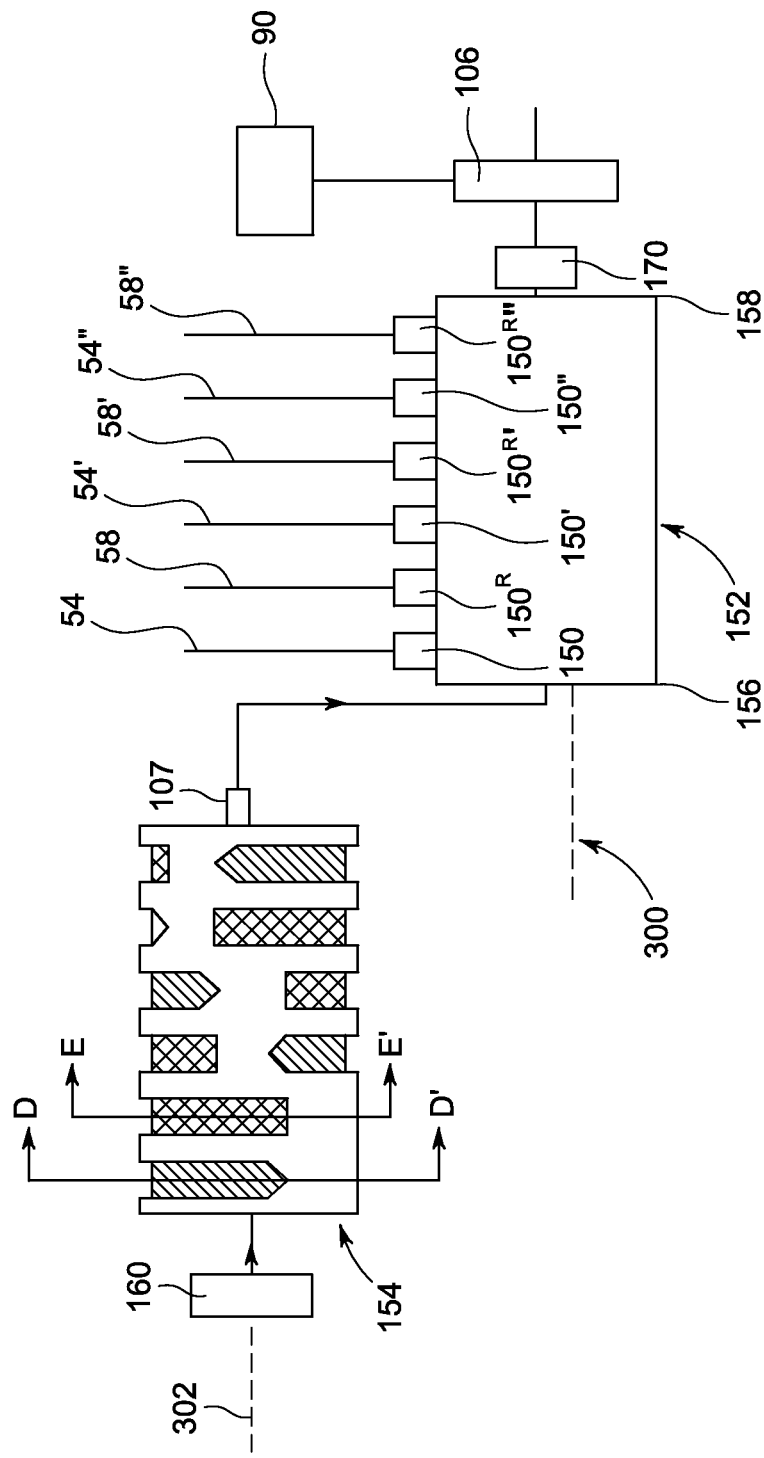
FIG. 1C is an exploded view and partially cut away schematic drawing of a rotary control valve for use with the hydraulic drive unit of FIG. 1B.

FIG. 1C shows the control valve 46, alternatively called the rotary control valve, in greater detail. The control valve 46 comprises an outer valve unit 152 and an inner valve unit 154 housed within the outer valve unit 152. The outer valve unit 152 and inner valve unit 154 are generally cylindrical and centered on a common longitudinal axis shown as dashed line 300. The control valve 46 has an input end 156 and an output end 158. A set of ports, including a forward port 150 and a reverse port $150^R$ that are positioned along the length of the outer valve unit 152. The ports 150, $150^R$ communicate through the wall of the outer valve unit 152. The forward port 150 and the reverse port $150^R$ are also referred to as the first and second ports respectively.

As shown in FIGS. 1B and 1C, when the system 10 has three water cylinders 14, 14', 14", the rotary control valve 46 comprises six ports, with one forward port 150 and one reverse port $150^R$ for each hydraulic cylinder 44, 44', 44". Each set of ports 150', $150^R$ exchanges hydraulic fluid with an associated hydraulic cylinder 44. In particular, ports 150, $150^R$ exchange hydraulic fluid with hydraulic cylinder 44, ports 150', $150^{R'}$ exchange hydraulic fluid with hydraulic cylinder 44', and ports 150", $150^{R''}$ exchange hydraulic fluid with hydraulic cylinder 44".

The forward port 150 communicates hydraulic fluid between the inner valve unit 154 and the first side 56 of the piston 52, via forward feed pipe 54. The reverse port $150^R$ communicates fluid between the inner valve unit 154 and the second side 60 of the piston 52, via reverse feed pipe 58. The following description focuses on the communication of hydraulic fluid between one hydraulic cylinder 44 and one set of ports 150, $150^R$, however, this description is applicable to all hydraulic cylinders 44 and all sets of ports 150, $150^R$ within the system 10.

The inner valve unit 154 is coupled to a motor 106 by a drive shaft 107. The motor 106 rotates the inner valve unit 154 within the outer valve unit 152 about the longitudinal axis at a generally constant rate. Hydraulic fluid from the hydraulic pump 42 enters the inner valve unit 154 by way of a supply union 160. The supply union 160 can be any type of connection that facilitates fluid flow between a stationary body and a rotating body. Hydraulic fluid passes through the supply union 160 to an inner supply channel 162 of the inner valve unit 154. Hydraulic fluid returns to the hydraulic pump 42 from the inner valve unit 154 by way of a return union 170. The return union 170 can be any type of connection that facilitates fluid flow between a stationary body and a rotating body. Hydraulic fluid passes to the return union 170 from an inner return channel 168 of the inner valve unit 154. The inner supply channel 162 is closed at the output end 158. The inner return channel is closed at the input end 156. Preferably, there is no mixing of the supply hydraulic fluid flow and the return hydraulic fluid flow within the rotary control valve 46.

The inner supply channel 162 and inner return channel 168 extend longitudinally through the inner valve unit 154.

Figure 1D:
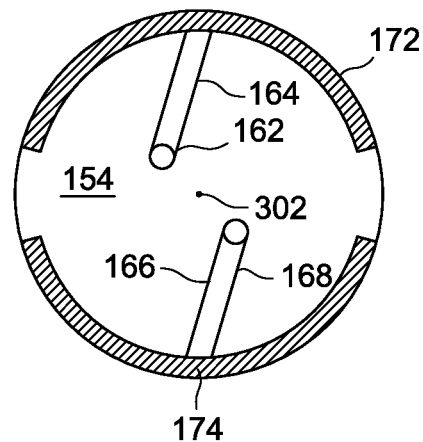
FIG. 1D is a cross-sectional view taken along line D-D' in FIG. 1C.
Figure 1E:
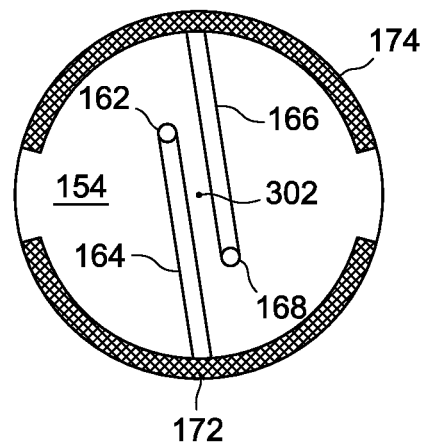
FIG. 1E is a cross-sectional view taken along line E-E' in FIG. 1C.

The inner supply channel 162 and the inner return channel 168 can be offset from each other and the rotational axis of the inner valve unit 154 (see line 302 in FIG. 1C). The inner valve unit 154 further comprises one or more communication supply lines 164 that extend from the supply channel 162 to the outer surface of the inner valve unit 154 (see FIG. 1D). The inner valve unit 154 further comprises one or more communication return lines 166 that extend from the outer surface of the inner valve unit 154 to the return channel 168 (see FIG. 1E).

As the inner valve unit 154 rotates, a communication supply line 164 and a communication return line 166 are put in fluid communication with each port 150, 150$^R$ for a certain part of the rotation. When a communication supply line 164 is in communication with one of a pair of ports 150, 150$^R$, a communication return line 166 is in communication with the other of the pair of ports 150, 150$^R$. Optionally, the fluid path for the return hydraulic fluid to leave the hydraulic cylinder 44 may open slightly in advance of the supply hydraulic fluid entering the hydraulic cylinder 44.

The outer surface of the inner valve unit 154 comprises one or more pairs of sequence slots, with each pair comprising a supply sequence slot 172 and a return sequence slot 174. The supply sequence slot 172 and the return sequence slot 174 extend partially around a circumference of the inner valve unit 154 without overlapping. Each pair of sequence slots is longitudinally aligned with an associated port, either with a forward port 150 or a reverse port 150$^R$. When supply hydraulic fluid flows through the forward port 150, the hydraulic piston 52 will move forward, or upward, as it is oriented in FIG. 1B and the piston rod 40 will extend out of the hydraulic cylinder 44. When supply hydraulic fluid flows through the reverse port 150$^R$, the hydraulic piston 52 will reverse backward or downward as it is oriented in FIG. 1B and the hydraulic piston rod 40 will retract into the hydraulic cylinder 44. The pair of sequence slots associated with the reverse port 150$^R$ will be denoted as 172$^R$, 174$^R$ in the following description.

The sequence slots 172, 174 extend below the outer surface of the inner valve unit 154. For example the sequence slots 172, 174 may be formed as trenches by removing material from the outer surface of the inner valve unit 154. Each communication supply line 164 opens to a supply sequence slot 172 which determines at what part of the rotation the communication supply line 164 communicates with a port 150, 150$^R$. Each communication return line 166 opens to a return sequence slot 174 which determines at what part of the rotation the communication return line 166 communicates with a port 150, 150$^R$. Each hydraulic cylinder 44 is associated with two ports 150, 150$^R$ and four sequence slots 172, 174, 172$^R$, 174$^R$.

The supply sequence slots 172 are always full of supply hydraulic fluid. As a leading edge 176 of a supply sequence slot 172 rotates into rotational alignment with the forward port 150, the supply hydraulic fluid passes through the forward port 150. To provide a balance of supply and return hydraulic fluid through the rotary control valve 46, part of the supply sequence slot 172 will be under the forward port 150 when part of the return sequence slot 174$^R$ is under the reverse port 150$^R$. Conversely, part of the return sequence slot 174 will be under the forward port 150 when part of the supply sequence slot 172$^R$ is under the reverse port 150$^R$. The configurations of the sequence slots 172, 174 determine the time, rate and direction of fluid flow to an associated hydraulic cylinder 44 and so determine the movement of an associated reciprocating assembly 26.

Figure 1F:
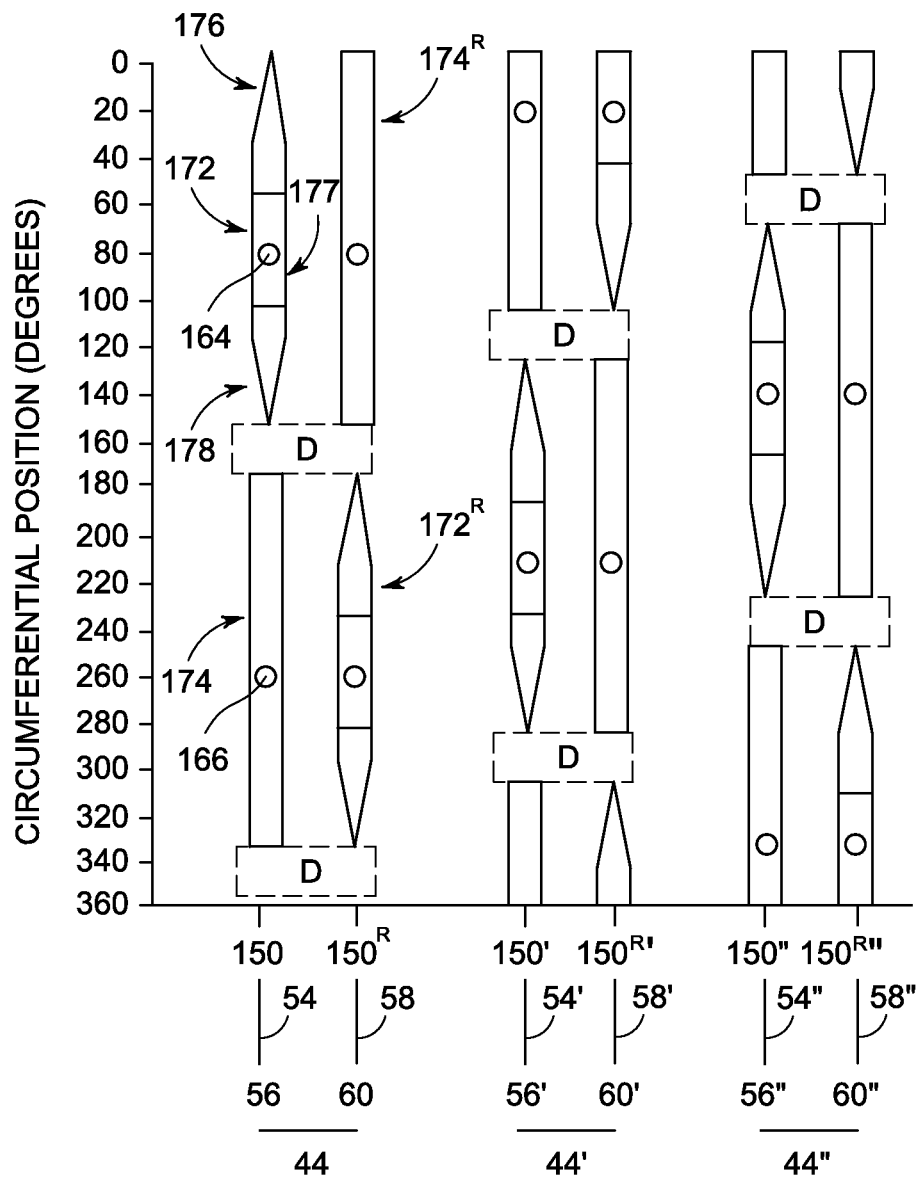
FIG. 1F is a schematic drawing of a pattern of sequence slots for use with the rotary control valve of FIG. 1C.

Referring to FIG. 1F, the sequence slots 172, 174 are shown projected onto a flat panel. The left hand axis represents the circumferential position, from 0 to 360 degrees, around the outer surface of the inner valve unit 154. The bottom axis depicts the longitudinal alignment of the sequence slots 172, 174 with the ports 150, 150$^R$ to the first side 56 and the second side 60 of the hydraulic piston 52 within each water cylinder 44. FIG. 1F also depicts regions labeled as "D" that do not include any sequence slot 172, 174. When these regions rotationally align with the ports 150, 150$^R$, the ports are closed and there is no flow of hydraulic fluid. These regions correspond with dwell periods (position 2 in Table 1) when the reciprocating assembly 26 does not move.

The supply sequence slots 172 comprise a leading edge 176, an intermediate segment 177 and a trailing edge 178. As the supply sequence slot 172 initially comes under the ports 150, 150$^R$, the leading edge 176 provides an initial cross-sectional flow area for the hydraulic fluid to flow through. The cross-sectional flow area at the leading edge 176 and the trailing edge 178 is smaller than the cross-sectional flow area through the intermediate segment 177. The cross-sectional flow area changes as the leading edge 176 and the trailing edge 178 come under a port 150, 150$^R$. The cross-sectional flow area through the middle segment 177 is preferably constant. As a result, a hydraulic cylinder 44 accelerates, then moves at a generally constant velocity, then decelerates in a forward direction. Then, after a dwell period, the hydraulic cylinder 44 accelerates, then moves at a generally constant velocity, then decelerates in a reverse direction. After another dwell period, the hydraulic cylinder repeats the same motions.

As shown in FIG. 1F, the circumferential position of the sequence slots 172, 174, 172$^R$, 174$^R$ for different sets of ports 150, 150$^R$ are offset or staggered from each other. This offset causes the hydraulic pistons 52, 52', 52" and the reciprocating assemblies 26, 26', 26", to move out-of-phase from each other. The out-of-phase movement of the reciprocating assemblies 26, 26', 26" provides a generally constant total flow of feed water cylinders 14, 14', 14" to the membrane unit 16.

The ports 150, 150$^R$ are preferably wider than the width of the sequence slots 172, 174.

Figure 1G:
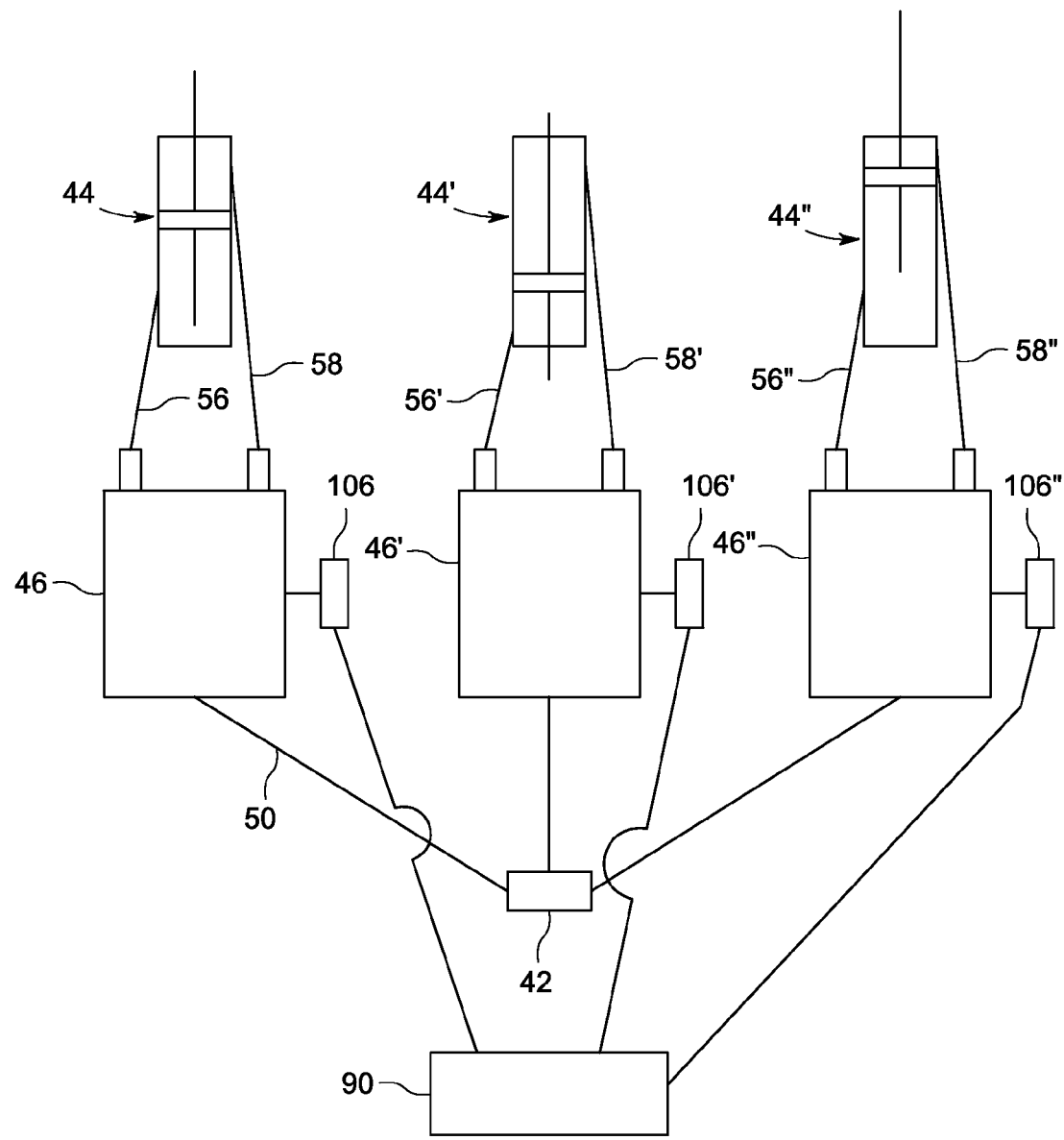
FIG. 1G is a schematic drawing of another hydraulic drive unit.

FIG. 1G depicts a variation of the system 10, with an individual rotary control valve 46, 46', 46" for each hydraulic cylinder 44, 44', 44". In this variation, each rotary control valve 46 has only one set of ports 150, 150$^R$ and only one pair of sequence slots 172, 174. A controller 90 co-ordinates the rotation of each of individual rotary control valve 46, 46', 46" to control the movement of each piston rod 52, 52', 52" and each reciprocating assembly 26, 26', 26". Alternatively, all of the rotary control valves 46, 46', 46" may be connected to a common drive shaft.

Optionally, the rotary control valve 46 includes a seal assembly (not shown) that limits the mixing of the supply hydraulic fluid and the return hydraulic fluid. For example, the seal assembly may comprise a free close tolerance gap that can provide for a bypass hydrostatic seal. This seal minimizes communication between the supply and return hydraulic fluid and inhibits hydraulic fluid from leaking along the longitudinal axis of the rotary control valve 46. Alternatively, the seal assembly may also comprise contact or friction seals that prevent hydraulic fluid mixing between the supply and return flows.

In one variation of the system 10, a set of shock absorbers 180 are positioned on the piston rod 40 (see FIG. 1B). The shock absorbers 180 provide a resistive force that slows the movement of the piston rod 40 as the hydraulic piston 52 approaches the end of a stroke length. For example, the shock absorber 180 can be a self-adjusting shock absorber that has a body secured to the piston rod 40, a moveable piston, a fluid filled chamber within the body and a reservoir also within the body and separated from the chamber by a wall. The fluid communicates with the reservoir via holes in the wall when the piston is displaced into the chamber. The arrangement of the holes generates a predetermined resistive force as the fluid is forced from the chamber into the reservoir. When the piston rod 40 approaches the end of a stroke, the shock absorbers 180 can strike an end wall of the hydraulic cylinder 44 and generate the resistive force that slows the velocity of the piston rod 40. Similarly, the shock absorber 180 will slow the velocity of the whole reciprocating assembly 26. One shock absorber 180 can be positioned on the piston rod 40 between the hydraulic cylinder 44 and the water cylinder 14. The shock absorber 180 provides the resistive force when the piston rod 40 is approaching the end of a reverse stroke. Preferably, the piston rod 40 extends from both sides of the hydraulic piston 52 and another shock absorber 180a is positioned on the opposite end of the piston rod 40, outside the hydraulic cylinder 44. The shock absorber 180a provides the resistive force to the travel of the piston rod 40 when the piston rod 40 is approaching the end of a forward stroke. As a further option, the shock absorbers 180 can also be positioned elsewhere on the reciprocating assembly 26.

In one variation of control valve 46, the motor 106 is a servo motor that includes sensors, such as encoders or resolvers, which detect the rotational position of the motor 106 which relates to the rotational position of the rotating unit, for example the inner valve unit 154, of the control valve 46 with respect to the non-rotating unit. This positional information is sent to the controller 90. The controller 90 compares the positional information with a positional reference chart that maps the position the rotating unit should be in, in time, to produce the assembly sequence 136. The position reference chart is pre-calculated and stored in the memory of the controller 90. The controller 90 is programmed to poll the positional reference chart at regular time intervals to determine the required position of the rotating unit at that time. Preferably, the controller 90 includes an independent proportional, integral and derivative (PID) loop that receives the positional information input from the motor 106 and generates a final PID output command. The PID output command can be sent to the motor 106 to modify the rate of rotating. For example, the step of comparing generates a positional error. The positional error is used to generate at least part of the PID output command by multiplying the positional error by a proportional gain term. Part of the PID output command can also be generated by multiplying an integral of the positional error, over time, with an integral gain term. The PID output command can also include a derivative of the positional error, over time, multiplied by a derivative gain term. The gain terms can be pre-calculated, based upon testing of the system 10, and stored in the memory of the controller 90. The final PID output command is the sum of the three corrected signals generated by each of the multiplication steps. The final PID output command is then sent to the motor 106 to modify, or not, the rotational rate of the rotating unit. Alternatively, the motor 106 can be a stepper motor that also provides positional information to the controller 90 and responds to commands from the controller 90.

In another variation of the rotary control valve 46, the inner valve unit 154 may be a tubular body. In this variation, the supply channel 162 and the communication supply lines 164 are a manifold of conduits supported within the inner valve unit 154. Similarly, the return channel 168 and the communication return lines 166 are a separate manifold of conduits that is supported within the inner valve unit 154. Optionally, the supply channel 162 and return channel 168 may independently rotate to provide the supply and return hydraulic fluid.

In another variation of the rotary control valve 46, the supply hydraulic fluid may enter the rotary control valve 46 on the same side as the return hydraulic fluid leaves the rotary control valve 46. For example, both the supply and return hydraulic fluid flow through either the input end 156 or the output end 158 of the rotary control valve 46.

Figure 2A:
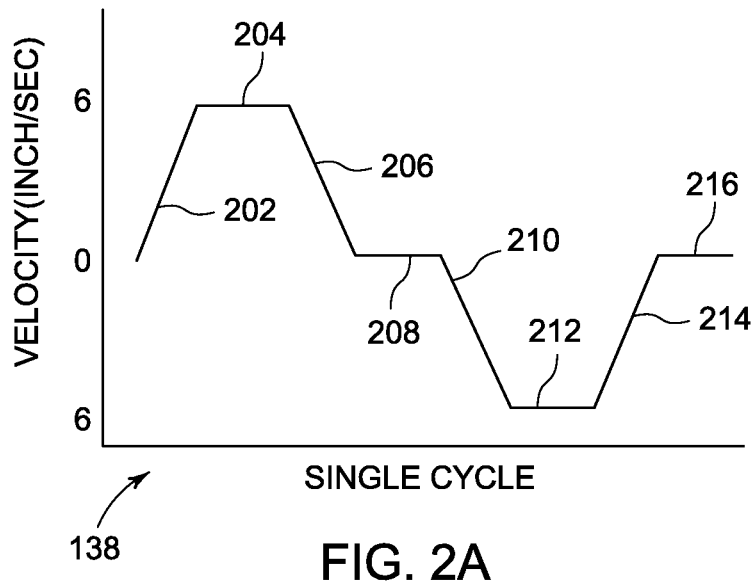
FIG. 2A is an intended water pump velocity profile for a single water pump.

FIG. 2A shows the velocity profile 138 of a single reciprocating assembly 26. The hydraulic piston 52 and piston rod 40 attached to this reciprocating assembly 26 follow the same velocity profile 138. In general, the reciprocating assembly 26 moves through a repeated cycle of movements. In each cycle, the reciprocating assembly 26 first moves in a forward direction, then stops for a dwell period, then moves in the reverse direction, then stops for a dwell period. The movement in the forward direction has an acceleration phase, a constant velocity phase and a deceleration phase. Similarly, the movement in the reverse direction has an acceleration phase, a constant velocity phase and a deceleration phase. For example, Table 2 shows the motions and positions (as defined in Table 1) of a control valve 46 during the cycle.

TABLE 2

| Reference numeral (FIG. 2A) | Cycle phase | Control valve 46 movement or position |
| --- | --- | --- |
| 202 | Accelerating forward | Moving from position 2 to position 1 |
| 204 | Constant velocity forward | Position 1 |
| 206 | Decelerating forward | Moving from position 1 to position 2 |
| 208 | Dwell | Position 2 |
| 210 | Accelerating reverse | Moving from position 2 to position 3 |
| 212 | Constant velocity reverse | Position 3 |
| 214 | Decelerating reverse | Moving from position 3 to position 2 |
| 216 | Dwell | Position 2 |

The cycle is implemented by the control valve 46. As described above, rotating the control valve 46 causes sequence slots 172, 174 to come under ports 150, 150$^R$ and connect pressurized hydraulic fluid with the hydraulic cylinders 44 at certain times.

Figure 2B:
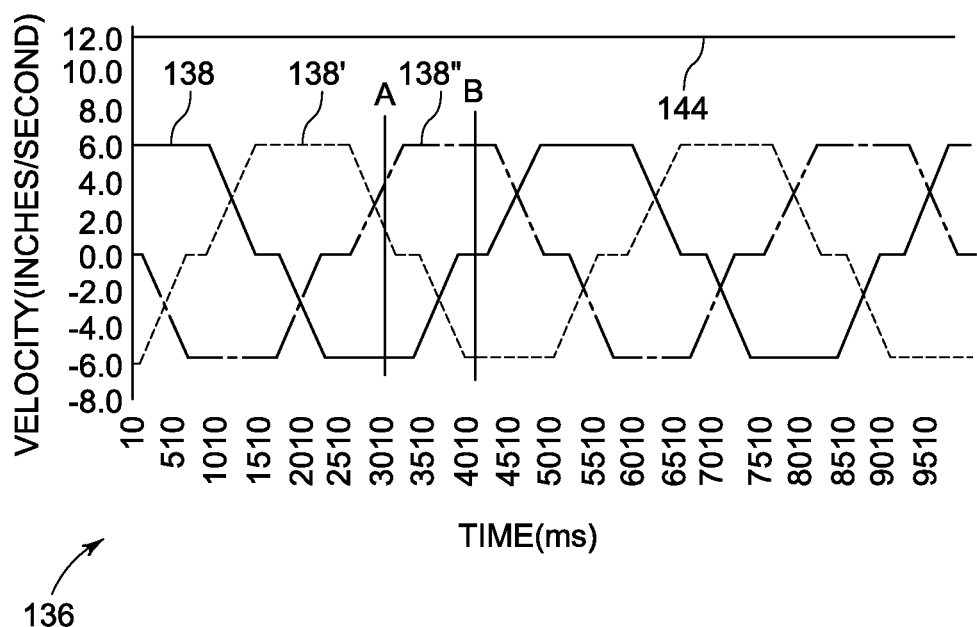
FIG. 2B is an intended water pump velocity profile for three water pumps.

FIG. 2B shows a desired assembly sequence 136. The assembly sequence 136 includes the velocity profiles 138, 138' and 138" of three reciprocating assemblies 26, 26', 26" over a period of time. The three velocity profiles 138, 138' and 138" are the same, but positioned out of phase, or with a relative time delay, such that the reciprocating assemblies 26, 26$^1$, 26$^{11}$ are not moving in the same direction at the same speed at the same time. Due to the operation of the water valves 70 described above, movement of a reciprocating assembly 26 in either direction produces a flow of feed water to the membrane unit 16. The sum of the absolute values of the velocities of the reciprocating assemblies 144 is essentially constant. The feed flow rate to the membrane unit 16 is also essentially constant. Similarly, the sum of the flow rates in forward feed pipes 54, 54' and 54", and the sum of the flow rates in reverse feed pipes 58, 58' and 58", are also essentially constant.

The staggered arrangement of the sequence slots 172, 174 causes the control valve 46 to implement the three velocity profiles 138, 138' and 138" in the phased relationship. Each portion of the control 46 moves through the same cycle but at different times. For example, at time A in FIG. 2B, one portion of control valve 46 is in position 3; another portion of control valve 46 is moving from position 1 to position 2; and, another portion of control valve 46 is moving from position 2 to position 1. At time B in FIG. 2B, one portion of control valve 46 is in position 2; another portion of control valves 46 is in position 3 and another portion of control valve 46 is in position 1.

During a velocity profile 138, there are four generally distinct pressures that occur within the system 10. The first pressure P1 is the pressure that supplies the feed water from the source 12 to the water cylinder 14. P1 can be provided by a variety of known pumps. The second pressure P2, which is higher than P1, is the pressure exerted on the feed water from the water cylinder 14 to the membrane unit 16. P2 is provided by the movement of the reciprocating assembly 26. The third pressure P3 is the pressure of the concentrate as it leaves the membrane unit 16 to return to the water cylinder 14. P3 is less than P2 since some of the energy is used to drive a filtration process of the membrane unit 16. The fourth pressure P4 is the pressure of the concentrate as it leaves the water cylinder 14 to the waste or recycling stream. P4 is less than P3. For example, P1 may be in the range of 5 to 100 p.s.i.; P2 may be in the range of 600 to 1000 p.s.i.; P3 may be in the range of 500 to 950 p.s.i.; and P4 may be in the range of 1 to 50 p.s.i.

Figure 3:
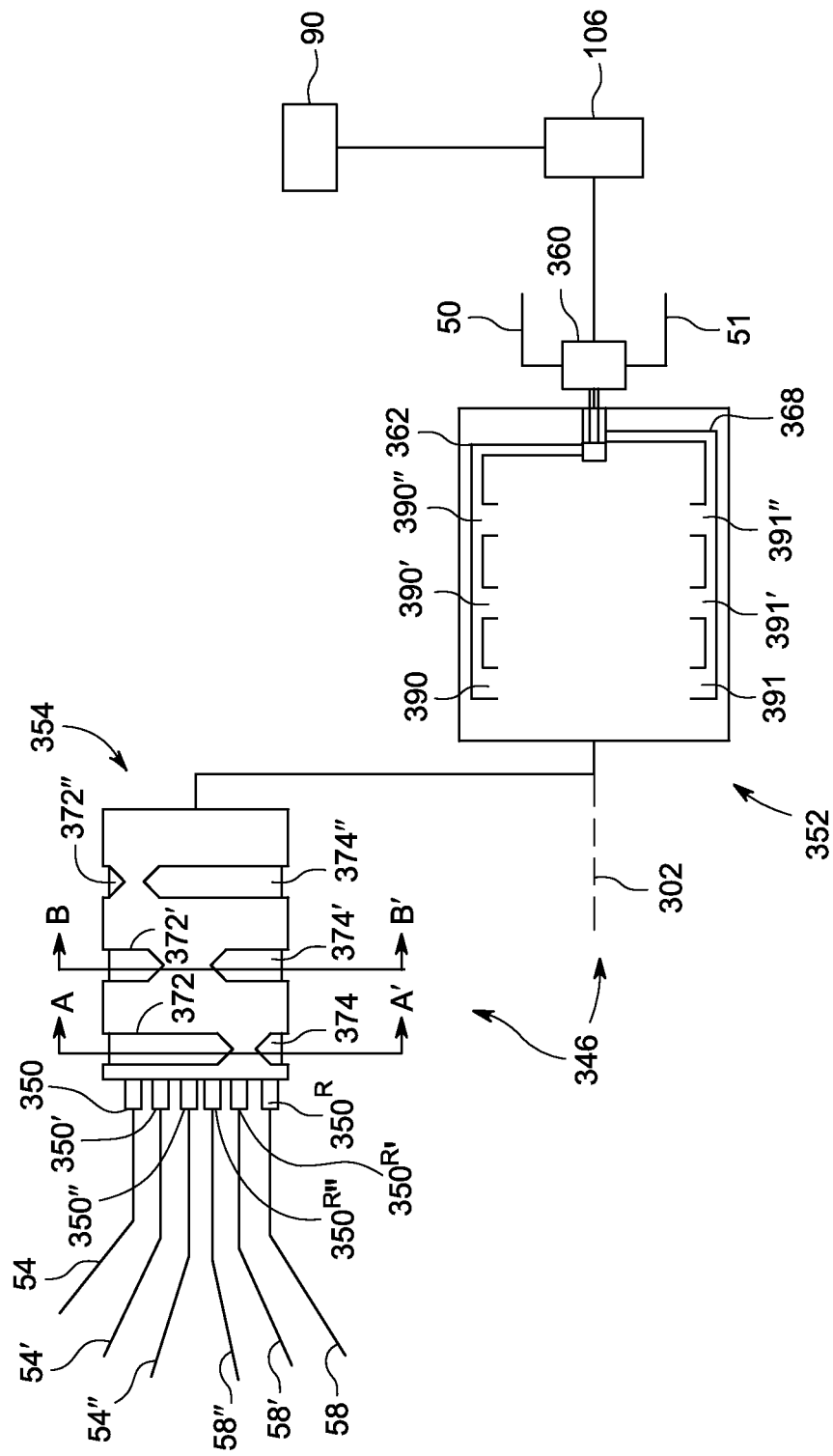
FIG. 3 is a schematic diagram of a variation of a rotary control valve.

FIG. 3 depicts a variation of a rotary control valve 346 that comprises a stationary inner valve unit 354, shown in a side view, and a rotatable outer valve unit 352, shown in a longitudinal sectional view. The outer valve unit 352 is connected to the motor 106 and rotates about the inner valve unit 354. The inner valve unit 354 includes a series of forward ports 350 and reverse ports 350$^R$ that extend from one end of the inner valve unit 354. The inner valve unit 354 also includes a series of forward sequence slots 372 and reverse sequence slots 374 that extend around the outer circumference. While FIG. 3 depicts the ports 350, 350$^R$ as collinear, the ports 350, 350$^R$ are can be arranged concentrically on the end of the inner valve unit 354. Various configurations of the concentrically arranged ports 150, 150$^R$ are possible, preferably the forward port 150 and the reverse port 150$^R$ for each hydraulic cylinder 44 are arranged diametrically opposed to each other.

Figure 3A:
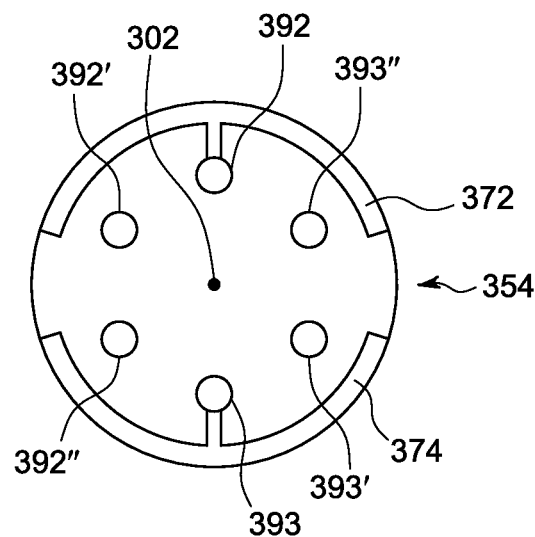
FIG. 3A is a cross-sectional view taken along line A-A' in FIG. 3.
Figure 3B:
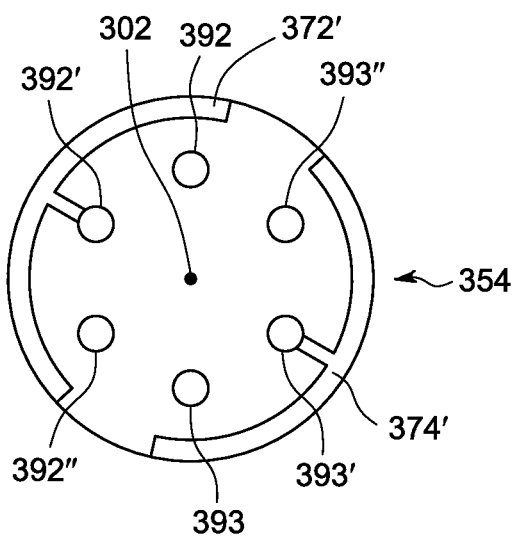
FIG. 3B is a cross-sectional view taken along line B-B' in FIG. 3.

Each forward sequence slot 372 is in fluid communication with a forward delivery channel 392 and each reverse sequence slot 374 is in fluid communication with a reverse delivery channel 393. The channels 392, 393 extend longitudinally through the inner valve body 354, offset from the axis of rotation 302. The forward port 350 connects the forward delivery channel 392 with the forward feed pipe 54 and the reverse port 350$^R$ connects the reverse delivery channel 393 with the reverse feed pipe 58. In the example depicted in FIGS. 3A and 3B, the forward delivery channel 392 is diametrically opposed to its associated reverse delivery channel 393. The inner valve unit 354 includes the pair of sequence slots 372, 374, the delivery channel 392, the reverse delivery channel 393 and the pair of ports 350, 350$^R$ for each hydraulic cylinder 44, 44', 44".

As shown in FIG. 3, the outer valve unit 352 has a central chamber to receive the inner valve unit 354. The outer valve unit 352 includes a supply channel 362 and a return channel 368 that each extend from a central point at one end of the outer valve unit 352. Each channel 362, 368 extends away from the central point and turns to extend longitudinally through the outer valve unit 354, offset from the axis of rotation 302. The supply channel 362 and return channel 368 are preferably on opposite sides, top and bottom, however other configurations are contemplated. The supply channel 362 receives supply hydraulic fluid from the supply pipe 50 via a concentric rotary union 360. The return channel 368 communicates return hydraulic fluid to the return pipe 51 via the concentric rotary union 360. The supply channel 362 includes supply communication slots 390, 390', 390" each of which longitudinally aligns with one pair of sequence slots 372, 374 when the inner valve unit 354 is in the central chamber. The return sequence channel 368 includes return communication slots 391, 391', 391", each of which longitudinally aligns with a pair of sequence slots 372, 374. The communication slots 390, 391 can be wider than or the same width as the sequence slots 372, 374.

Figure 3C:
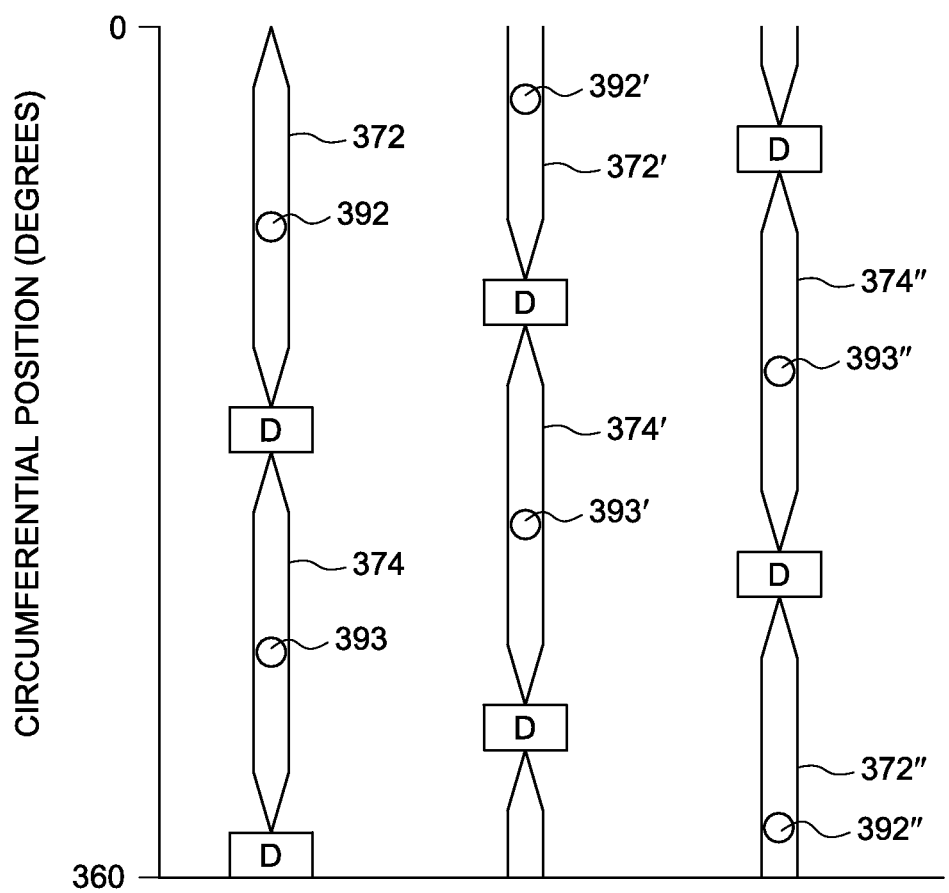
FIG. 3C is a schematic drawing of a variation of the pattern of sequence slots.

FIG. 3C depicts the sequence slots 372, 374 arranged in a different pattern than the pattern depicted in FIG. 1F. The sequence slots 372, 374 are shown projected onto a flat panel. The left hand axis represents the circumferential position, from 0 to 360 degrees, around the outer surface of the inner valve unit 354. FIG. 3D also depicts dwell regions, labeled as "D", that do not include any sequence slot 372, 374.

As the outer valve unit 352 rotates, the supply communication slots 390 rotationally align with the sequence slots 372, 374 to provide supply hydraulic fluid the forward delivery channels 392 and the reverse delivery channels 393. During rotation of the outer valve unit 352, the return communication slots 391 rotationally align with the sequence slots 372, 374 and receive return hydraulic fluid from the forward delivery channels 392 and the reverse delivery channels 393. When the communication slots 390, 391 rotationally align with a dwell region there is no flow of hydraulic fluid to or from the hydraulic cylinder 44. The dwell regions correspond with dwell periods (position 2 in Table 1) when the reciprocating assembly 26 does not move. As depicted in FIG. 3C, the pairs of sequence slots 372, 374 are staggered, in a similar fashion to FIG. 1F. The staggered arrangement causes the control valve 346 to implement the three velocity profiles 138, 138' and 138" in the phased relationship as described above.

When the sequence slots 372, 374 are arranged as depicted in FIG. 3C, the cross-sectional flow area at the leading edge and trailing edge is preferably smaller than the cross-sectional flow area through the intermediate segment of the sequence slots 372, 374. The cross-sectional flow area through the middle segment is preferably constant. As described above, the smaller cross-sectional flow areas provide a faster flow of supply hydraulic fluid, which causes the control valve 346 to implement the three velocity profiles 138, 138', 138".

Figure 4:
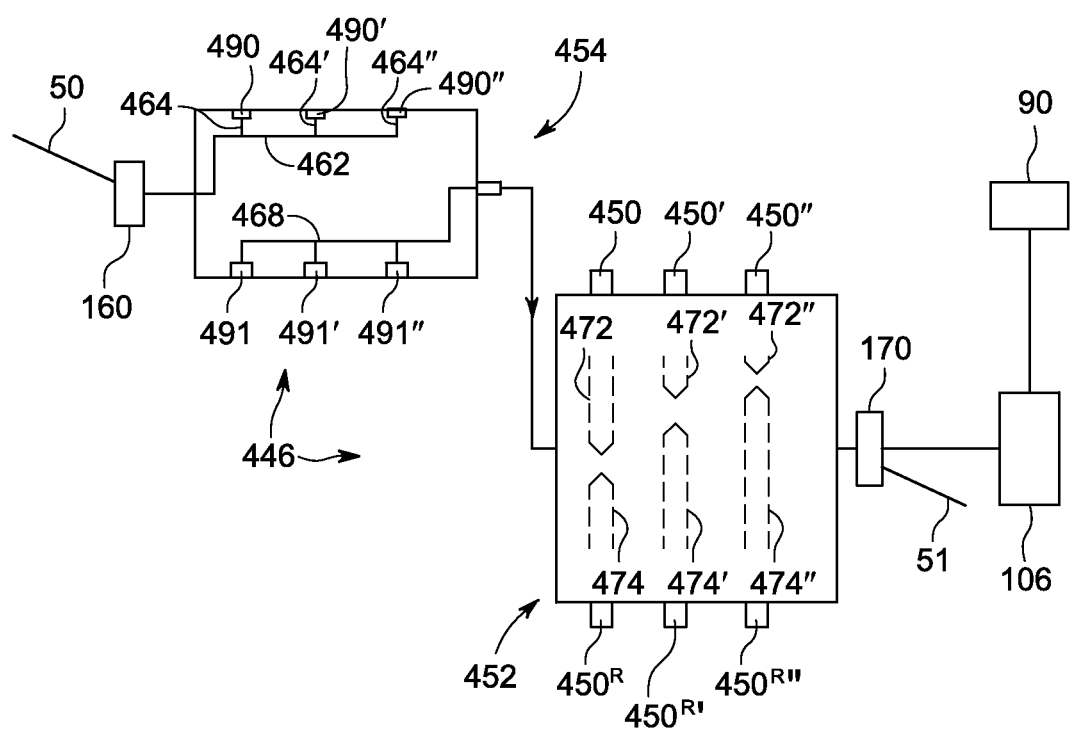
FIG. 4 is a schematic diagram of another variation of a rotary control valve.

FIG. 4 depicts another variation of a rotary control valve 446 that comprises a rotating inner valve unit 454 and a stationary outer valve unit 452. The variation of FIG. 4 is similar to the rotary control valve 46, described above. The inner valve unit 454 is connected to the motor 106.

The primary difference between the rotary control valves 46 and 446 is that sequence slots 472, 474 are located on an inner surface of the outer valve unit 452. FIG. 4 depicts a longitudinal cross-section of the inner valve unit 454. A supply channel 462 extends from a central region towards the outer surface of the inner valve unit 454. The supply channel 462 has a turn and then extends longitudinally from one end of the inner valve unit 454 towards the other end. The supply channel 462 receives supply hydraulic fluid from the supply rotary union 160, which is in fluid communication with the supply pipe 50. The supply channel 462 includes supply communication lines 464 that extend from the supply channel 462 to the outer surface of the inner valve unit 454. The supply communication lines 464 open into supply communication slots 490 at the outer surface of the inner valve unit 454. The inner valve unit 454 also includes a return channel 468 that communicates with the outer surface of the inner valve unit 454 by return communication lines 466. The return communication lines 466 also include return communication slots 491 at the outer surface. The return channel 468 extends longitudinally through the inner valve unit 454 and has a turn and then extends centrally. The return channel 468 is in fluid communication with the return rotary union 170, which in turn is in fluid communication with the return pipe 51.

The inner surface of the outer valve unit 452 includes a series of forward sequence slots 472 and reverse sequence slots 474. The sequence slots 472, 474 are depicted in FIG. 4 with stippled lines and they can be in the same arrangement as depicted in FIG. 3C. The outer valve unit 452 also includes forward ports 450 and reverse ports $450^R$. The sequence slots 472, 474 are positioned on the inner surface of the outer valve unit 542 in a staggered arrangement (as depicted in FIG. 3C with the sequence slots 372, 374). Similarly, the ports 450, $450^R$ are staggered about the outer surface of the outer valve unit 542. The forward port 450 is in fluid communication with the forward sequence slot 472 and the reverse port $150^R$ is in fluid communication with the reverse sequence slot 472. For a given hydraulic cylinder 44, the ports 150, $150^R$ are preferably positioned diametrically opposite to each other on the outer surface of the outer valve unit 452. Optionally, the ports 150, $150^R$ can be in different configurations around the outer surface of the outer valve unit 452 provided the sequence slots 472, 474 are in fluid communication with the ports 150, $150^R$.

As the inner valve unit 454 rotates, the supply communication slot 490 will rotationally align with the forward sequence slot 472 and communicate supply hydraulic fluid through the forward port 150 to the hydraulic cylinder 44 to move the hydraulic piston 52 in the forward direction. At the same time, the return communication slot 491 will rotationally align with the reverse sequence slot 474 and return hydraulic fluid will flow from the hydraulic cylinder 44 to the return pipe 51. As the inner valve unit 454 continues to rotate, the communication slots 390, 391 will rotationally align with a dwell region of the arrangement of sequence slots and the flow of hydraulic fluid will stop. As the inner valve unit 454 continues to rotate, the supply communication slot 490 will rotationally align with the reverse sequence slot 474 and supply hydraulic fluid flows to the hydraulic cylinder 44 and the hydraulic piston 52 moves in the reverse direction. At the same time, the return communication slot 491 is in rotational alignment with the forward sequence slot 472 and the return hydraulic fluid is communicated to the return pipe 51. Rotation of the inner valve unit 454 provides a flow of hydraulic fluid through the rotary control valve 446 that produces the velocity profiles 138, 138', 138".

Figure 5:
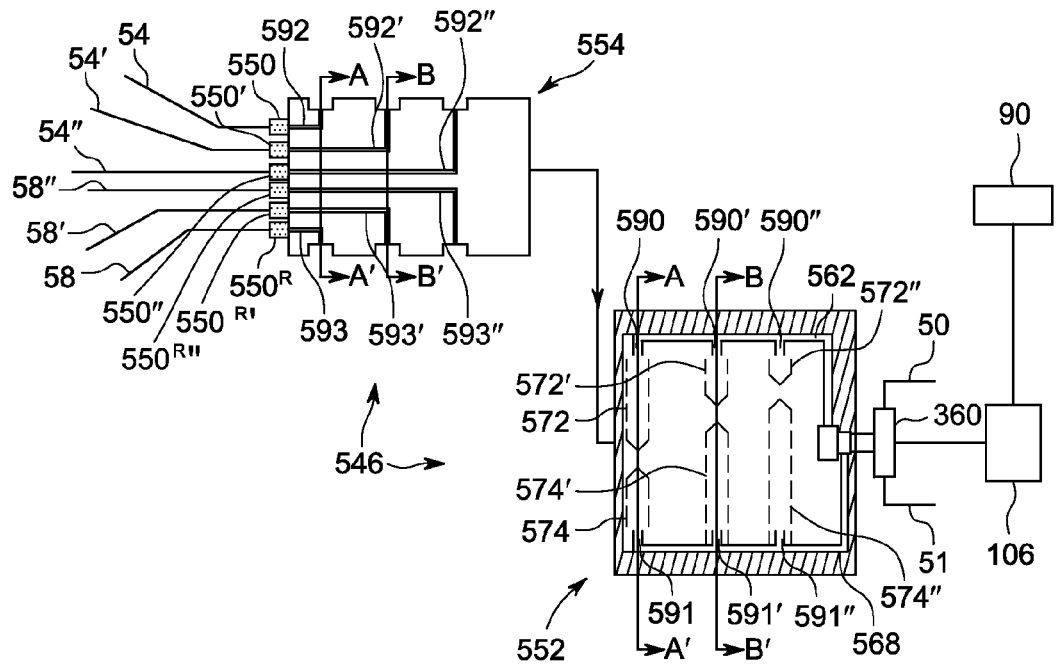
FIG. 5 is a schematic diagram of another variation of a rotary control valve.

FIG. 5 depicts another variation of a rotary control valve 546 that comprises a stationary inner valve unit 554 and a rotatable outer valve unit 542. The outer valve unit 542 is connected to the motor 106 and rotates about the inner valve unit 554. Both units 552, 554 are shown in a longitudinal, sectional view. The inner valve unit 554 is similar to the inner valve unit 354 described above, except there are no sequence slots on the outer surface of the inner valve unit 554. The inner valve unit 554 comprises a series of forward delivery channels 592 and a series of reverse delivery channels 593. The channels 592, 593 extend longitudinally through the inner valve unit 544. The forward delivery channels 592 are in fluid communication with a forward port 550 and the forward feed pipe 54. The reverse delivery channels 593 are in fluid communication with a reverse port $150^R$ and the reverse feed pipe 58. The edges of the channels 592, 593 that terminate at the outer surface of the inner valve unit 544 can be wider than, or the same width, as a set of sequence slots 572, 574 on an inner surface of the outer valve unit 542.

Figure 5A:
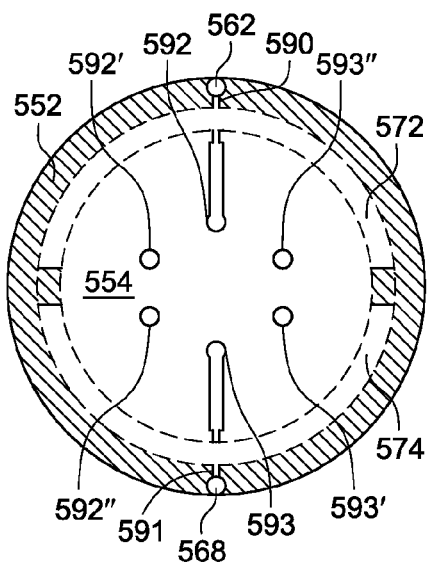
FIG. 5A is a cross-sectional view taken along line A-A' in FIG. 5.
Figure 5B:
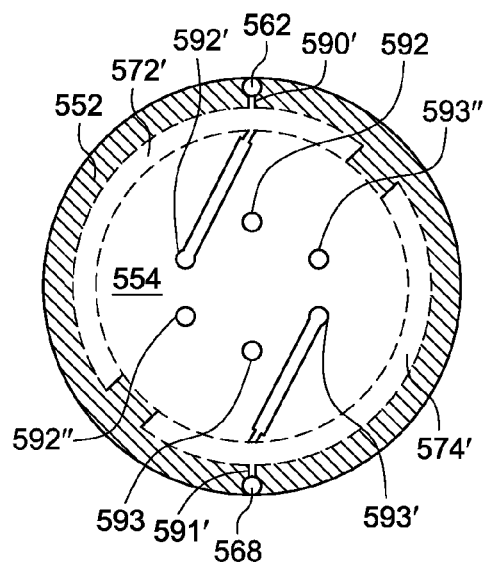
FIG. 5B is a cross-sectional view taken along line B-B' in FIG. 5.

The FIGS. 5A and 5B depict cross-sectional views taken through the lines A-A' and B-B' when the inner valve unit 544 is housed within the outer valve unit 542. FIGS. 5A and 5B depict the forward delivery channels 592 and the reverse delivery channels 593 concentrically arranged through the inner valve body 554.

The outer valve unit 552 is similar to the outer valve unit 352 described above with the exception that the sequence slots 572, 574 (shown in stippled lines) are located on the inner surface of the outer valve unit 552. The sequence slots 572, 574 can be arranged on the inner surface of the outer valve unit 552 as depicted in FIG. 3C.

The outer valve unit 552 includes a supply channel 562 and a return channel 568 that each begin at a central position proximal to a concentric rotary union 460. The channels 562, 568 extend from the central position towards the outer surface and turn to extend longitudinally through the outer valve unit 554. The supply channel 562 and return channel 568 are depicted as being on opposite sides, top and bottom, however other configurations are contemplated. The supply channel 562 is in fluid communication with the supply pipe 50 via a concentric rotary union 560. The return channel 568 is in fluid communication with the return pipe 51, also via the concentric rotary union 560. The supply channel 562 includes supply communication slots 590, 590', 590" each of which longitudinally aligns with one pair of the sequence slots 572, 574. The return sequence channel 568 includes return communication slots 591, 591', 591", each of which longitudinally aligns with a pair of sequence slots 572, 574. The communication slots 590, 591 can be wider than, narrower than, or the same width as the sequence slots 572, 574. The rotary control valve 546 operates in a similar manner as the rotary control valve 346, described above, so that while the outer valve unit 552 rotates the communication slots 590, 591 periodically rotationally align with the delivery channels 592, 593 to produce a flow of hydraulic fluid through the rotary control valve 546 that produces the velocity profiles 138, 138', 138".

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:

1. A rotary control valve comprising:
    a rotatable unit configured to rotate about a longitudinal axis;
    a stationary unit;
    a fluid supply input and a fluid return output;
    a plurality of fluid ports; and,
    a plurality of pairs of sequence slots positioned on one of the rotatable unit and the stationary unit, each sequence slot comprising a supply sequence slot and a return sequence slot extending partially around a circumference of one of the rotatable unit and the stationary unit without overlapping,
wherein,
the supply sequence slot is part of a supply fluid communication path from the fluid supply input to one of the fluid ports, and
the return sequence slot is part of a return fluid communication path from the fluid return output to the same one of the fluid ports,
wherein the rotatable unit is rotatable with respect to the stationary unit to open and close the supply fluid communication path and the return communication path of each of the plurality of pairs of sequence slots, whereby each pair of sequence slots alternatively completes the supply fluid communication path and the return fluid communication path when the rotatable unit is rotated,
and wherein the plurality of pairs of sequence slots comprises a number of identical pairs of sequence slots radially offset from each other by 360 degrees divided by the number, each identical pair of sequence slots corresponding to a hydraulic cylinder.

2. The rotary control valve of claim 1, wherein the rotatable unit is an inner valve unit, the stationary unit is an outer valve unit and the inner valve unit is housed within the outer valve unit.

3. The rotary control valve of claim 2, wherein the plurality of pairs of sequence slots is positioned on an outer surface of the inner valve unit.

4. The rotary control valve of claim 2, wherein the plurality of pairs of sequence slots is positioned on an inner surface of the outer valve unit.

5. The rotary control valve of claim 1, wherein the rotatable unit is an outer valve unit and the stationary unit is an inner valve unit housed within the outer valve unit.

6. The rotary control valve of claim 5, wherein the plurality of pairs of sequence slots is positioned on an outer surface of the inner valve unit.

7. The rotary control valve of claim 5, wherein the plurality of pairs of sequence slots is positioned on an inner surface of the outer valve unit.

8. The rotary control valve of claim 1, wherein each sequence slot of the plurality of sequence slots comprises a leading edge, an intermediate segment and a trailing edge and wherein the at least some of the leading edge and the trailing edge have a smaller cross-sectional flow area than the intermediate segment.

9. The rotary control valve of claim 8, wherein the cross-sectional flow area of the intermediate segment is constant.

10. The rotary control valve of claim 1, wherein the plurality of pairs of sequence slots are circumferentially staggered relative to the longitudinal axis so that the communication paths from the fluid input to each fluid output open in a phased manner.

11. A liquid pumping system comprising,
a plurality of liquid pumps;
a plurality of hydraulic cylinders, wherein each liquid pump is connected to a different hydraulic cylinder;
one or more rotary control valves connected to the plurality of hydraulic cylinders; and,
a hydraulic pump connected to the rotary control valve, wherein each of the one or more rotary control valves comprises:
a rotatable unit configured to rotate about a longitudinal axis;
a stationary unit;
a fluid supply input and a fluid return output, the fluid supply input connected to the hydraulic pump to supply hydraulic fluid from the hydraulic pump to the rotary control value, and the fluid return output connected to the hydraulic pump to return hydraulic fluid from the rotary valve to the hydraulic pump;
a plurality of fluid ports, each fluid port connected to one of the plurality of hydraulic cylinders; and,
a plurality of pairs of sequence slots positioned on one of the rotatable unit and the stationary unit, each sequence slot comprising a supply sequence slot and a return sequence slot extending partially around a circumference of one of the rotatable unit and the stationary unit without overlapping,
wherein,
the supply sequence slot is part of a supply fluid communication path from the fluid supply input to one of the fluid ports, and
the return sequence slot is part of a return fluid communication path from the fluid return output to the same one of the fluid ports,
wherein the rotatable unit is rotatable with respect to the stationary unit to open and close the supply fluid communication path and the return communication path of each of the plurality of pairs of sequence slots, whereby each pair of sequence slots alternatively provides a supply and return of fluid to an aligned port and thereby to the hydraulic cylinder connected to the aligned port,
and wherein the plurality of pairs of sequence slots are arranged so that each of the hydraulic cylinders follows the same velocity profile but phased relative to each other by 360 degrees divided by the number of hydraulic cylinders such that the total liquid flow produced from the liquid pumps is constant over a period of time in which the hydraulic pump produces a constant output.

12. The liquid pumping system of claim 11, wherein each liquid pump comprises one or more pistons.

13. The liquid pumping system of claim 12, wherein the one or more pistons are adapted to pump liquid on both a forward and a return stroke.

14. The liquid pumping system of claim 13, wherein the one or more pistons further comprise a piston rod and the piston rod comprises a set of shock absorbers that are positioned on the piston rod to generate a resistive force when the one or more pistons approach an end of the forward stroke and an end of the return stroke, each shock absorbers comprising a wall with holes separating a chamber from a reservoir, the holes adapted to generate a resistive force as fluid is forced from the chamber to the reservoir.

15. The system of claim 11, further comprising a membrane unit in fluid communication with the plurality of liquid pumps.

* * * * *